United States Patent [19]

Kilgore et al.

[11] Patent Number: 4,926,560
[45] Date of Patent: May 22, 1990

[54] SHADE FOR TELESCOPIC SIGHT

[76] Inventors: Eldon F. Kilgore, 809 Clearwater Trail, Round Rock, Tex. 78664; Howard J. Kilgore, Rte. 1, Box 190, Elmott, Tex. 76640

[21] Appl. No.: 384,031

[22] Filed: Jul. 24, 1989

Related U.S. Application Data

[63] Continuation of Ser. No. 120,159, Nov. 13, 1987, abandoned.

[51] Int. Cl.[5] .................. F41G 11/00; F41G 1/38
[52] U.S. Cl. ...................... 33/244; 350/581; 42/101; 33/245
[58] Field of Search .......... 33/242, 244, 245; 350/580, 581, 276 R; 42/100, 101

[56] References Cited

U.S. PATENT DOCUMENTS

| | | | |
|---|---|---|---|
| 1,848,879 | 3/1932 | Halbasch | 350/581 |
| 2,352,844 | 7/1944 | Loebe | 350/580 |
| 2,696,672 | 12/1954 | Durfee | 33/244 |
| 2,845,835 | 8/1958 | Weiss | 350/581 |
| 2,947,557 | 8/1960 | Schwab et al. | 33/161 |
| 2,968,099 | 1/1961 | Peters | 33/244 |
| 3,977,113 | 8/1976 | Howell | 33/244 |
| 3,983,634 | 10/1976 | Erickson | 33/244 |
| 4,089,117 | 5/1978 | Villarreal | 350/580 |
| 4,399,616 | 8/1983 | Jansson | 33/161 |
| 4,610,517 | 9/1986 | Fukino et al. | 350/580 |

FOREIGN PATENT DOCUMENTS 0020706  4/1908  United Kingdom ............... 350/581

Primary Examiner—William A. Cuchlinski, Jr.
Assistant Examiner—Patrick R. Scanlon
Attorney, Agent, or Firm—Joseph F. Long

[57] ABSTRACT

A glare shade for a rifle scope that may be manually removably mounted and is comprised of extensible sections containing light admitting apertures.

2 Claims, 1 Drawing Sheet

SHADE FOR TELESCOPIC SIGHT

This application is a continuation of application Ser. No. 07/120,159, filed 11/13/87 and now abandoned.

BACKGROUND OF THE INVENTION

Telescopic sights are now quite generally used by hunters and in most situations are an excellent aid to proper shooting. However, in early morning and late afternoons the sun may be at such an angle as to cause a glare in the telescopic sights of the rifle so it may be virtually impossible to see the exact spot necessary for the hunter to see. Also, a slight fog or haze may make visibility through the rifle scope less than desired.

This invention is directed toward providing an easily mounted adjustable shade to allow proper visibility through the telescopic sight of the rifle even when aiming in the direction of the sun. Briefly the invention comprises three open cylindrical tubes that slide into each other with a slotted end on the smaller of these cylindrical tubes. This slotted end allows the "fingers" between the slots to be easily compressed or expanded so that this end may be easily clamped on the outer end of the telescopic sight. The shade then may be extended to two sections or three sections length. Now each section contains a multiplicity of rectangular openings so that non-direct light is admitted into the open tube shade. These rectangular openings are aligned transverse to the longer axis of the shade.

In one embodiment each section of the shade is tapered and near the larger end of the first and second sections there is a groove on the outer periphery. At the smaller end of the second and third sections there is a circular protrusion on the inner periphery so that the shade may be pushed together to be approximately the length of the first section or extended and snapped together to be the length of two sections or extended to the full three section length with the third section snapping into the second section while the second section snaps into the first section. Sections may be rotated to allow optimum admission of light. A semi-rigid plastic with a white interior and dull exterior is the preferred material of manufacture. With the shade as described the hunter may extend the shade full length and shoot in the direction of the sun. Use has shown that visibility is also improved using the shade when there is a mist or haze that is caused by the sun shining on fine water droplets.

We have described a unique shade but minor changes could be made without changing its function. We therefore do not wish to be limited to exact details but only as to the spirit and purpose as covered in these claims and specifications.

BRIEF STATEMENT OF THE INVENTION

The invention comprises a telescoping three part shade with apertures in each part to admit light. In one embodiment the shade has slots in the smaller end so that the "fingers" formed by the slots are easily compressible and the shade then may be fastened on the rifle scope by using a compression type clamp similar to a normal hose clamp. A thumb screw type tightener would be used.

The three parts of the shade may be tapered and made with a circular depression and matching protrusions so that the shade may be collapsed to one third the maximum length or extended to two-thirds the maximum length and snapped in place or fully extended and snapped in place. Each portion may be rotated to secure optimum admission of light.

In another embodiment each section fits closely into the other and an O ring mounted on the beginning section and another O ring on the second section provides sufficient friction that the shade may be smoothly extended from on third the maximum length to the full length. There are "stops" provided so that the sections will not easily pull apart. This embodiment may also be mounted, using compressible fingers and a friction clamp.

In either embodiments a stretcheable band around the "fingers" may be used so that mounting may be accomplished by simply pushing the shade over the end of the scope.

In still other embodiments the collapsable segments may simply be a non-galling material and may be so sized as to hold in position by friction alone.

DETAILED DESCRIPTION OF THE DRAWINGS

Figure 1:
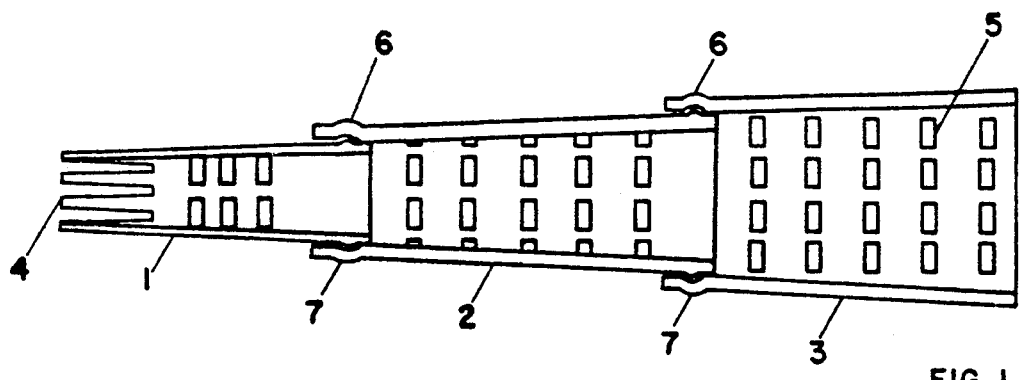
FIG. 1 shows a first embodiment wherein each of three sections of the shade are tapered and snap together when extended. We have also indicated compressible "fingers" that may be clamped to the rifle scope.

In FIG. 1 we've shown a first embodiment of the invention where the first section 1 may be telescoped into the second section 2 and the second section 2 may be telescoped into the third section 3. A raised circular protrusion 7 for the first section 1 snaps into a collar 6 on the second section 2 and a similar raised circular protrusion 7 on section 2 snaps into a similar collar 6 on section 3 when the shade is fully extended. Rectangular light admitting apertures 5 are in all three sections. Compressible fingers 4 are used for mounting the shade to the rifle scope.

Figure 2:
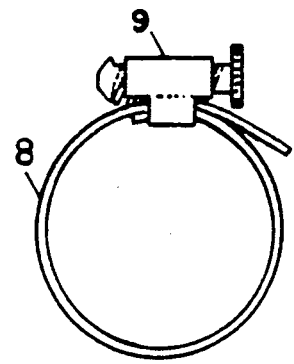
FIG. 2 shows a friction type clamp similar to a hose clamp.

In FIG. 2 we show a normal hose type friction compression ring clamp 8 (with a thumbscrew actuator 9) used to slip over compressible fingers 4, FIG. 1 to mount the shade securely on a rifle scope.

Figure 3:
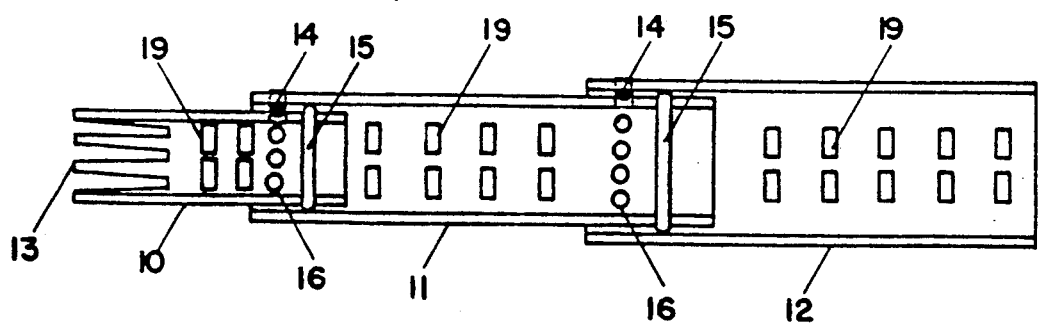
FIG. 3 shows a second embodiment wherein each section fits closely to the other and an O ring is used to provide sufficient friction to hold the sections in place as the shade is extended or collapsed.

In FIG. 3 we show another embodiment wherein compressible segments 13 on a beginning end of a first section 10 allow clamping to a rifle scope; the first section 10 also containing rectangular apertures 19, an O ring 15 fitted in a groove and rounded indentations 16 to allow a rounded tip spring loaded catch 14 to hold the first section 10 from slipping out of the second section 11. In a similar manner the second section 11 contains rectangular apertures 19 and rounded indentations 16 to allow a second spring loaded catch 14 on the beginning end of a third section 12 to prevent the second section 11 from slipping out of the third section 12. The second section also contains a second O ring 15 to increase friction betwen the sections so that sections 10, 11, and 12 will hold in a partially collapsed position.

Figure 4:
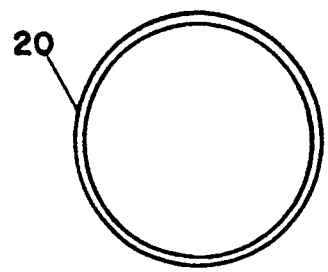
FIG. 4 shows a stretchable band that may be used in place of the friction type clamp.

FIG. 4 shows a strong elastic band 20 that is smaller than the circumference of section 1, FIG. 1 or section 10, FIG. 3 and may be used to compress the ends of either embodiment to hold firmly but releaseably on a rifle scope.

What is claimed is:

1. An extensible shade for a telescopic sight comprising:
    a plurality of concentric tubular sections arranged successively in overlapping, sliding relationship, each section having an exterior surface with a multiplicity of light admitting apertures formed therein,
    means to fasten a first one of said tubular sections to an exit end of a telescopic sight, and
    means to hold said plurality of tubular sections in fixed position relative to one another.

2. A shade for a telescopic sight as in claim 1 where said means to fasten said tubular sections to a telescopic sight comprises a multiplicity of slots formed in an end of said first one of tubular sections and an elastic band to releaseably fasten said end having the multiplicity of slots to a telescopic sight.

* * * * *